United States Patent [19]

Giddings

[11] Patent Number: 4,797,752
[45] Date of Patent: Jan. 10, 1989

[54] INFORMATION STORAGE CARRIER AND METHOD FOR STORING DUPLICATE INFORMATION

[75] Inventor: Gary M. Giddings, Laguna Hills, Calif.

[73] Assignee: Discovision Associates, Costa Mesa, Calif.

[21] Appl. No.: 579,618

[22] Filed: Feb. 13, 1984

Related U.S. Application Data

[62] Division of Ser. No. 327,321, Dec. 4, 1981.

[51] Int. Cl.$^4$ .................... H04N 5/85; G11B 7/007
[52] U.S. Cl. ...................................... 358/342; 369/32; 369/54; 369/275
[58] Field of Search ................. 358/336, 335, 342; 369/32-33, 50, 54, 58, 100, 109-111, 275; 360/10.1, 35.1, 381; 365/215, 234

[56] References Cited

U.S. PATENT DOCUMENTS

| | | |
|---|---|---|
| 3,761,903 | 9/1973 | Bird, Jr. et al. . |
| 3,883,891 | 5/1975 | Thompson et al. . |
| 3,931,457 | 1/1976 | Mes ........................................ 369/33 |
| 4,138,741 | 2/1979 | Hedlund et al. ..................... 365/234 |
| 4,145,758 | 3/1979 | Drexler et al. . |

FOREIGN PATENT DOCUMENTS 0046323  2/1982  European Pat. Off. .

OTHER PUBLICATIONS

Patent Abstracts of Japan, vol. 4, No. 134, p. 28(6/6), 9/19/80.

Primary Examiner—Raymond F. Cardillo
Assistant Examiner—Steven R. Garland
Attorney, Agent, or Firm—Discovision Associates

[57] ABSTRACT

An information storage member has a surface upon which information is stored in at least first and second series of lineal regions arranged on the surface of the member and defining a program of information having a first subprogram part and a second subprogram part each containing information representative of a block of program information and being accompanied by an associated identifying number unique from every other identifying number present on the recording surface of the information storage member.

4 Claims, 5 Drawing Sheets

FIG. 2
SECTION OF VIDEO
DISC (PRIOR ART)

INFORMATION STORAGE CARRIER AND METHOD FOR STORING DUPLICATE INFORMATION

CROSS REFERENCE TO A RELATED APPLICATION

This is a division of application Ser. No. 327,321 filed Dec. 4, 1981.

BACKGROUND OF THE INVENTION

1. Field of the Invention

The present invention relates to an information storage carrier for storing intelligence information along a path on the carrier extending from an upstream location to a downstream location, and more particularly, to a video disc containing prerecorded intelligence information in the form of a series of television picture frames with each series of frames being duplicated on the surface of the carrier at at least two locations. By duplicating a program of video information on the storage member, the player playing back the prerecorded information can search for and play back a second, or further, duplicate version of the program upon detecting improper reproduction of the information played back from the first program version, or upon failure to detect the presence of the first program.

2. Description of the Prior Art

Video discs structures are described by John Winslow in his patent application entitled "Mastering Machine," filed Mar. 27, 1978, Ser. No. 890,407, now U.S. Pat. No. 4,225,873 issued Sept. 30, 1980, and assigned to the assignee of the present invention. A video disc structure is also described by John Holmes in his patent application entitled "Video Disc Composition and Method of Molding" filed Aug. 28, 1978, Ser. No. 937,221, and assigned to the assignee of the present invention, now abandoned.

Other prior art references which pertain to the field of this invention include: U.S. Pat. No. 4,228,326, issued Oct. 14, 1980 to Dakin, et al which discloses a video disc rotating at a constant linear velocity relative to a read head for the disc and teaches the use of "concentric circles" track format; U.S. Pat. No. 4,161,753 issued July 17, 1979 to Bailey et al disclosing the interlacing of data for picture frames on the same track and teaches the formatting of a video disc rotating at a constant angular velocity relative to its read head.

Each of the prior art video disc structures bear information in the form of concentric circles or a spiral track extending from an upstream start position to a downstream end position. The disc is played by causing a read head to progress along the concentric circular or spiral path from the upstream to downstream positions and to play out a complete program as it progresses from start to finish. If the length of the program recorded on the video disc were shorter than the available time on the disc surface, the remaining unrecorded disc area would be left blank.

Upon playing back the prerecorded program, the read head of the player can encounter defects or blemishes on the surface of the disc, thereby destroying the synchronization and/or color registration or causing picture loss often accompanied by a noisy (snowy) interval. The defect or blemish on the disc could be the result of imperfect manufacturing processes or caused by mishandling of the disc by the user. While the quality control of video discs produced for distribution are closely monitored, and while present technology applied in the production of the video disc provides a disc which is reasonably insensitive to handling, 100% quality control is not achievable, and inadvertent dropping or scratching of the disc surface by the user is not uncommon. In the past, in order to improve yield in the recovery of information, and recognizing the fixed limits of disc production yield, several disc players were loaded with similar discs, and a video/audio (or r.f.) switcher would select one of the player outputs, and upon detection of an error would switch to another player. Obviously, this is an expensive solution to the problem and furthermore does not improve signal recovery probability in areas of the disc that are defective due to certain systematic production irregularities. A scratch or dust particle in a disc stamper, for example, could cause the same defect in each disc produced by that machine. Thus, no number of redundant players could serve to eliminate signal loss at such a defect location. The present invention, on the other hand, both eliminates the need for redundant players and eliminates the effects of systematic production irregularities, since the redundancy of information lies in different portions of the disc. Accordingly, there is a need in the art for a video disc having a higher production yield for a given recorded program, yet having the ability to avoid or significantly reduce the problems associated with a defective disc passing through quality control or with improper handling by the ultimate user. The present invention is directed to a formatting technique for overcoming the disadvantages associated with the aforementioned problems.

SUMMARY OF THE INVENTION

An information storage carrier is described having a storage member for storing intelligence information along a path on the member extending from an upstream location to a downstream location. A first series of lineal regions is arranged on the surface, each region of the first series of regions containing information representative of a portion of the information stored in the first series of regions. A second series of lineal regions is arranged on the surface and spaced from the first series of lineal regions, each region of the second series of regions containing information representative of the same portion of the information stored in a corresponding region of the first series of lineal regions, thereby providing duplication of the information at two locations on the storage member.

In a preferred embodiment of the invention, the series of lineal regions is a series of television picture frames arranged in substantially concentric circles on a videodisc.

The recorded information is arranged in track-like fashion on the information bearing surface of the carrier preferably in the form of a disc. Alternate reflective and nonreflective indicia are successively positioned along the information track. The light reflective indicia is preferably represented by a planar shape portion while the light nonreflective indicia is represented by a bump or raised portion. Each bump has an upper surface lying in a second plane in common with all other upper surfaces of all bumps. The bumps may be provided with a flat top surface.

In reading a video disc, a player causes the disc to rotate typically at 1800 rpm beneath a read head which focuses a laser light beam onto the disc. As the disc rotates, the light beam is reflected or not from the surface depending upon whether a planar portion between bumps or a bump is encountered by the light beam as it impinges the disc surface. As a result, the constant collimated light beam impinging upon the surface of a disc is reflected from the disc surface in the form of an interrupted reflected beam of light which can be sensed by a photodetector, amplified, and observed and listened to on a standard television monitor or comparable equipment.

Since the bumps are arranged in track-like fashion along a substantially circular path on the disc surface, proper translational drive mechanisms and tracking mirror arrangements can be provided to keep the light beam focused on the track in spite of certain small defects in the disc surface or of deviations caused by eccentricity of the tracks relative to the axial center line of the spindle rotating the disc. By adapting the translational drive mechanisms and the tracking mirror arrangements to respond to control signals, a player can be programmed to search for a predetermined position on the disc, and it is relatively common for a player to search for a specific single track which is identified by a frame number encoded in the information prerecorded on each track. Accordingly, and if so instructed, a player can search for, locate, and playout a single track of information from among some 54,000 tracks of a modern laser-recorded video disc. After acquisition of the selected track, the player can replay that track repeatedly (i.e., still frame the track) or it can use the selected track as the start point from which it and subsequent tracks are read out.

With the present day technology capable of recording 54,000 tracks on one (or each) side of a video disc, a full half hour of program material can be recorded in standard NTSC format, that is when a single picture frame occupies a complete revolution of the disc, i.e. using a constant angular velocity (CAV) mode of recording. In the constant linear velocity (CLV) mode of recording, upon playback the same video disc can carry programs up to 1 hour in length. In the latter case, however, the larger diameter tracks of the disc contain more picture frames than the inner tracks of lesser diameter, and the vertical interval portions of a standard television signal are not aligned along a radius of the disc. Nevertheless, it is still possible to search for, locate, and begin playing a constant linear velocity disc even though the latter is more suitable for continuous running movie - type programs than for still-frame programming. The present invention takes advantage of the high information density on a video disc, either in the constant angular velocity mode or in the constant linear velocity mode to add a degree of playback fidelity heretofore unknown.

The quality of information retrieved from a videodisc can be evaluated in several ways. For example, one quality assessment check is that of "drop out", i.e., a temporary loss of signal. This is useful in the assessment of analog type program material. For digitally stored material, such checks as parity bit check, data redundancy comparisons, and a check on the sums of numbers in a series are among known techniques. In the past, upon detection of errors using these techniques, and depending upon degree and relevancy, discs containing such errors were discarded. The present invention greatly reduces the number of discs that must be discarded by effectively increasing the yield by orders of magnitude.

Basically, the present invention involves the recording of programs which are relatively short as compared with the available length of time that can be recorded on a video disc. In carrying out the invention, the program is recorded at more than one location (first version) on the disc surface, thereby permitting the player to index to the first program information location on the disc, and if the information retrieved at that location is not of appropriate quality, the player automatically searches for, locates, and plays the next repeated program version. This process would also result in the event that the frame searched for upon initial starting up of the player was not found due to a defect or blemish in the record suface. In such a case, the player will automatically search for the same frame number originally searched for incremented by a fixed frame count, such as 10,000. For example, in the still frame or CAV mode, a user can instruct the machine, via a push button control panel or unit, to locate and playout frame number 268. In the event that, upon searching for such a frame number, the frame number is not located, or the video signal is not within acceptable tolerance limits at that location, the frame number searched for is incremented by 10,000, and the player searches for and plays out frame number 10,268. If the program is of such a length that it can be repeated every 10,000 frames (also every 10,000 tracks), the program could be repeated on a disc of 54,000 tracks five times, so that upon the occasion of a very large blemish, defect, or other imperfection in the disc surface spanning two or more bands of repeated program material, the layer can jump ahead to frame numbers 20,268, 30,268, or 40,268. Since most surface defects are smaller in radial length than 10,000 tracks, the chances are excellent that one of the five programs of material can be properly located and played out with full fidelity of the original recording.

An appreciation of the improved yield as a result of duplicating programs on a videodisc can be seen in the following examples. Yield analyses have been performed on discs exiting a production line and have shown that 1 bad track in every 100 (i.e., 1/100 defects ratio) represents a relatively bad yield; 1/1000 represents a medium good yield; and 1/10000 represents an excellent yield. Assuming that the program to be recorded is short enough to be recorded on the disc twice, and assuming that the spacing between like program segments on the disc is sufficient to avoid the possibility of a defect spanning such like program segments, the overall yield of the disc is equal to the product of the yield ratios for the two like programs. Since both programs are located on the same disc, this analysis results in an equivalent yield ratio equal to the square of the yield ratio if only one program version were recorded. If the basic yield ratio for a given disc were 1/100, repeating the program once would produce an equivalent yield ratio of (1/100) (1/100)=1/10000, thus rendering the otherwise "bad yield" disc an "excellent yield" disc. Carrying this analysis further, if the disc in the example just given had an initial yield ratio of 1/1000 duplicating the program material once would produce a 1/1M equivalent yield ratio, where M=1 million. Finally, and in like manner, a 10000 initial yield ratio would produce an equivalent 1/100M yield ratio.

Needless to say that the yield ratio improvement by this method is orders of magnitude greater than that obtained by implementing tedious, expensive, and complex manufacturing process optimization techniques. Furthermore, for programs of a length to permit duplication of the program twice (resulting in a total of three program versions on the disc), even a "bad yield" disc would have an equivalent yield ratio of (1/100)(1/100)(1/100) = 1/1M. Since a disc has typically 54,000 tracks on one side, the latter example indicates that $$\frac{1 \text{ defective track}}{1 \text{ M tracks}} \times \frac{54,000 \text{ tracks}}{\text{Disc side}} =$$

.054 defective tracks per disc side would result, and this is an extremely good figure even for a disc containing all still frame information. Another way to state the latter given figure is $1/0.054 = 18.5$ discs per defective track, or the chances are that one defective track would occur, on the average, for every 18.5 single sided discs.

The present invention can be implemented by arranging a program in a series of spaced bands on the disc surface, with the beginning frame number of each band being incremented by the number of tracks separating the beginning of one band from the beginning of the next band. That is, in the CAV mode, a 15 minute program can be repeated twice on a single side of the disc, and the fixed increment of frame numbers between like program parts is in the vicinity of 27,000 frames or tracks. Similarly, for a 10 minute program, the program material can be duplicated two additional times (i.e., repeated three times) on the disc surface, and the fixed increment is 18,000 frames. A similar analysis can be made for the CLV mode of operation where, for example, a 15 min. program can be duplicated three additional times (i.e., repeated four times), and the frame increment between bands is 13,500.

It should be noted that the term "program" in the above and following discussions can refer to a continuous "movie-type" program in which each successive frame along a spiral track contains a different sequential picture of the movie sequence, or it can refer to a plurality of still frames arranged in concentric circles and which, taken as a group, constitute a "program" of video material. Furthermore, it is to be understood that in the foregoing and following commentary, reference to a "video program" or similar term carries with it the implication that one or more audio tracks accompany the recorded visual material.

Further, it can be appreciated that the program to be recorded may have subprogram parts that are vitally important and other parts that are relatively unimportant. For example, if part of a program were in a movie format showing actors and sets only and part were in still frame showing details of a table or chart of information, drop outs due to defects in the movie portion are not nearly as vital as those in the still frame portion. Accordingly, the still frame part could be termed a subprogram, and only this subprogram could be repeated at another location on the disc. Other examples of subprogramming for duplication are obvious and need not be discussed here.

Finally, while the search feature of a video disc player operates best in the CAV mode where the vertical intervals are radially aligned, a search and find instruction can be carried out by a player operating in the CLV mode. In this respect, since still frame processing requires constantly repeating the same track of information on the disc, the CAV mode must be used. In the CAV mode, both concentric circles, which is best suited for still frame operation, or spiral tracking can be used, the latter best suited for continuous "movie-type" programs. Any recorder/playback system utilizing any combination of CAV, CLV, concentric circles, and spiral tracks which are consistent with practical applications and technical limitations can benefit by incorporating the characteristics of the present invention.

In a preferred embodiment of the invention, the information storage carrier contains a pair of program areas on the disc, each program area comprising a series of lineal regions arranged such that each region of one of the series of regions contains information rerresentative of a portion of the program stored in the complete series. The second and further series of lineal regions are arranged on the disc surface spaced from the first series of lineal regions and from one another such that each region of each other series of regions contains information representative of the same portion of the information stored in a corresponding region of the first series of lineal regions.

Preferably, a video program is recorded in annular banded areas on the disc in the form of a plurality of concentric circles, or in a spiral extending from an upstream to a downstream position with each spiral occupying a substantially circular track on the disc surface. The program is then repeated in its entirety in a second annular band spaced from the first band. Depending upon the length of the program and the length of available time on the disc surface, the program is repeated a whole number of times equal to Available Time ÷ Program Length.

In a further embodiment, the program material is repeated in interleaved fashion on the disc surface. That is, a segment of the first version of the program is recorded at an upstream location on the disc, and the similar segment from the second version of the program is recorded at the next downstream location, and similarly for the first segments of the remaining program versions.

Following the last of the "first segments", that is from the last program version, the second segment from the first program version is recorded followed by the similar second segment from the second program version, and so on until all segments of all versions are recorded.

By this interleaving of programs, identical segments of programming lie adjacent to one another, and, as before, the number of times the program is repeated, i.e., the number of identical adjacent tracks is found by dividing the total available recording time for the surface of the disc by the length of the program to be repeated. While this method of encoding a disc does not avoid large surface defects or blemishes, it does provide duplicate programs for the player to search in the event that a small blemish or defect would be encountered upon playback of the first program, and this form of interleaved programming is especially useful when the search time between sensing a defect in one program and making acquisition of the next program is required to be as short as possible. Thus, in the interleaved embodiment of the invention, a sensed defect in one program would be cured by substituting the program on an adjacent track, and the longer search time required of the banded embodiment previously described can be avoided.

As with the earlier described banded configuration, the interleaved configuration can accommodate both concentric circular segments or a spiral configuration for the program material.

The foregoing and other objects, features, and advantages of the invention will be apparent from the following more particular description of a preferred embodiment of the invention, as illustrated in the accompanying drawings.

DETAILED DESCRIPTION OF THE SHOWN EMBODIMENTS

The same numeral is used in the several views to represent the same element.

Figure 1:
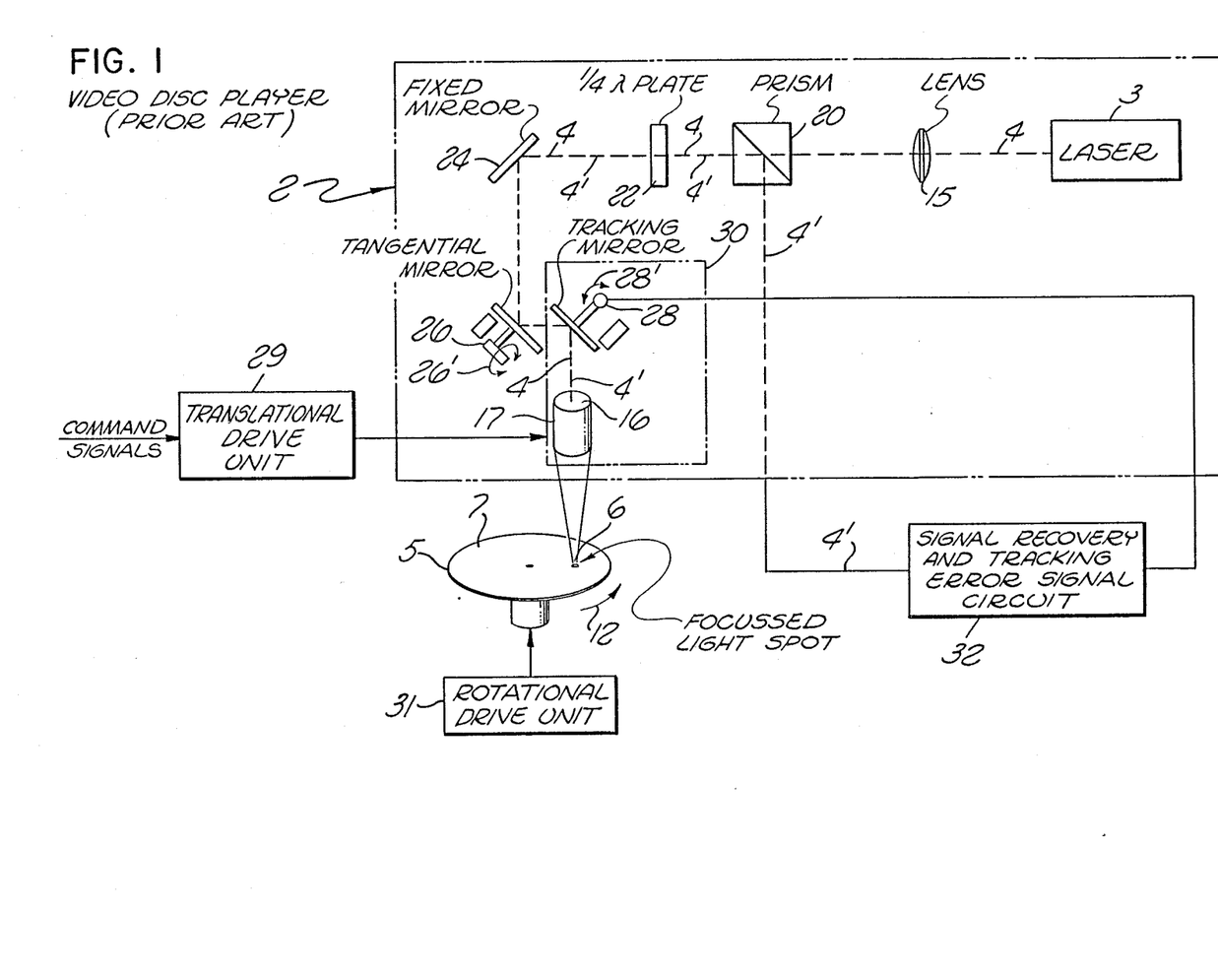
FIG. 1 is a bock diagram of a prior art video disc player showing the relationship of the video disc with the remainder of the electronics and mechanisms used in the player.

Referring to FIG. 1, there is shown a schematic block diagram of an optical system 2 employed in a typical prior art video disc player system. The optical system 2 includes a read laser 3 employed for generating a read beam 4 which is used for reading a frequency modulated encoded signal stored on a video disc 5. The read beam 4 is polarized in a predetermined direction. The read beam 4 is directed to the video disc 5 by the remaining members of the optical system 2. The video disc 5 is read by imaging the light beam 4 to a spot 6 at its point of impingement with the video disc 5.

Figures 2, 3:
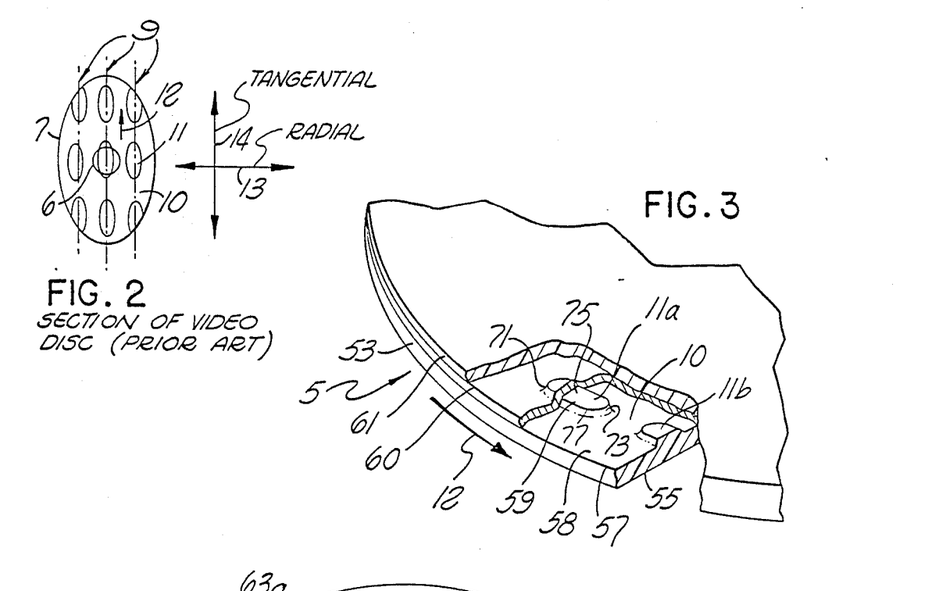
FIG. 2 shows a greatly enlarged schematic view of a portion of the video disc shown in FIG. 1.
FIG. 3 is a partial selectional and perspective view of a video disc structure shown in FIG. 1.

An enlarged view of a portion of an information bearing surface 7 of the video disc 5 is shown in FIG. 2. Each of a plurality of information tracks is generally indicated by a line 9 which is drawn through a plurality of successively positioned specular light reflective surface segments 10 and non-specular light reflective members 11. One form of non-specular light reflectivity is light scattering of the type which occurs when the focused light beam 4 impinges upon a bump shaped member 11 carried upon a disc 5 which is rotating at a high rate of speed, e.g., 1800 rpm. The detailed description of these segments 10 and members 11 is given hereinafter. The counterclockwise direction of rotation of the disc 5 relative to read beam 4 is indicated by the arrow 12. The read beam 4 has two degrees of movement, the first of which is in the radial direction as indicated by a double headed arrow 13; the second of which is the tangential direction as indicated by a double headed arrow 14. The double heads of each of the arrows 13 and 14 indicate that the read beam 4 can move in opposite directions in both the radial direction and the tangential direction.

The optical system 2 further comprises a lens 15 employed for shaping the beam 4 to fully fill an entrance aperture 16 of a microscopic objective lens 17. The objective lens is employed for forming the spot 6 of light at the point of impingement with the regions 10 and 11 of the information track 9. Improved results have been found when the entrance aperture 16 is overfilled by the reading beam 4. This results in maximum light intensity at the spot 6.

After the beam 4 is properly formed by the lens 15, it passes through a beam splitting prism 20. The transmitted portion of the beam 4 is applied through a quarter-wave plate 22 which provides a forty-five degree shift in polarization of the incident light forming the beam 4. The read beam 4 next impinges upon a fixed mirror 24 which redirects the read beam 4 to a first articulated mirror 26 rotatable in the directions of double headed arrow 26'. The function of the first articulated mirror 26 is to move the light beam in a first degree of motion which is tangential to the surface 7 of the video disc 5 to correct for time base errors introduced into the reading beam 4 because of eccentricities in the player or in the manufacture of the disc 5. The tangential direction is in the forward and/or backward direction along the informtion track 9 on the video disc 5 as indicated by the double headed arrow 14.

The first articulated mirror 26 directs the light beam to a second articulated mirror 28. The second articulated mirror 28 is rotatable in the directions of double headed arrow 28' and is employed as a radial tracking mirror. It is the function of the tracking mirror 28 to respond to a composite tracking error signal by slightly changing its physical position with relationship to the read beam 4 to control the point of impingement 6 of the read beam for radially tracking the information members 10 and 11 along a single information track 9. The second articulated mirror 28 has one degree of movement which moves the light beam back and forth in a radial direction over the surface of the disc 5 in the direction indicated by the double headed arrow 13. The read beam 4 finally enters the entrance aperture 16, as previously described, and is focused to a spot 6 upon the information track 9 of the video disc 5 by the objective lens 17.

At various playing modes of the player, it is necessary to translate the read head distances, or at rates, too great for the tracking mirror 28 to accommodate. Thus, for initial start-up and during the execution of search commands, a translational drive unit 29 is provided. By mechanical or other equivalent means, and under servo control, translational drive unit 29 effects coarse translational movements for the objective lens 17 and thus for the light beam 4. However, in order to reduce the mass needed to be moved in order to effectuate such translational movement of the read head and to consequently be more responsive to feedback servo control signals, tracking mirror 28 and object lens 17 are positioned on a movable carriage 30. Carriage 30 is movable by translational drive unit 29 only along the axis of the light beam 4 leaving tangential mirror 26. Upon receiving command signals from an operator keyboard or internal control unit (not shown), translational drive unit 29 moves carriage 30 to the desired location (desired track 9) on disc surface 7.

A rotational drive unit 31 is shown schematically for providing rotational drive energy to the disc 5, and it can be readily appreciated that coarse movement of the head relative to the disc can, alternatively, be accomplished by maintaining the objective lens and tracking mirror 28 stationary while translating the disc 5 itself. For the purposes of the present invention, both configurations are equivalent and can perform the necessary function of searching, acquiring of track identification signals, and maintaining tracking on or initiating tracking of a specific track on the disc surface 7.

In the normal playing mode, the focused beam of light impinges upon successively positioned specular light reflective regions 10 and non-specular light reflective members 11 representing the frequency modulated recorded information. The non-specular reflective members 11 are light scattering elements carried by the video disc 5. The reflected beam identified at 4' is thus a modulated light beam. The modulated reflected beam 4' is a light equivalent of the frequency modulated signal represented by the specular light reflective and non-specular light reflective members 10 and 11 positioned in the track 9. The modulated light beam from the disc 5 is gathered by the microscopic objective lens 17 as it is reflected from the successively positioned members 10 and 11. The reflected read beam 4' retraces a portion of the same path previously described for the impinging read beam 4. This path includes sequential reflection from the second articulated tracking mirror 28, the first articulated tangential mirror 26, and the fixed mirror 24. This common path in the read optical system 2 is identified by numeral 4 for the incident light beam and numeral 4' for the reflected beam. The reflected read beam 4' next passes through the quarterwave plate 22. The quarterwave plate 22 provides an additional forty-five degree polarization shift resulting in a total of ninety degree shift in polarization of the reflected read beam 4' with respect to the incident read beam 4. The reflected read beam 4' now impinges upon the beam splitting prism 20 which diverts the ninety degree phase shifted reflected read beam 4' to impinge upon a signal recovery and tracking error signal circuit indicated generally at 32. The circuit 32 generates the radial tracking error signal identified hereinafter.

Referring to FIG. 3, there is shown a partial sectional and perspective view of a video disc member 5. The video disc 5 includes a substrate member 53 having a first or entrance surface at 55 and an upper second or information bearing surface 57. The upper surface 57 includes a planar-shaped surface portion 58 which includes segments 10 functioning as the specular light reflective portion of an information track 9 (see FIG. 2). The upper surface 57 further includes non-planar shaped surface regions 59 functioning as the non-specular light reflective members 11 of an information track. Each of the specular light reflective segments 10 is positioned between a pair of non-specular light reflective regions such as 11a and 11b. Segments 10 and members 11 are greatly magnified and disproportional for purposes of illustration only.

A highly reflective layer 60 is formed over the surface 57 and a protective coating 61 is formed over the highly reflective layer 60. The preferred material for the layer 60 is a metal which also acts as a vapor barrier.

Figure 4:
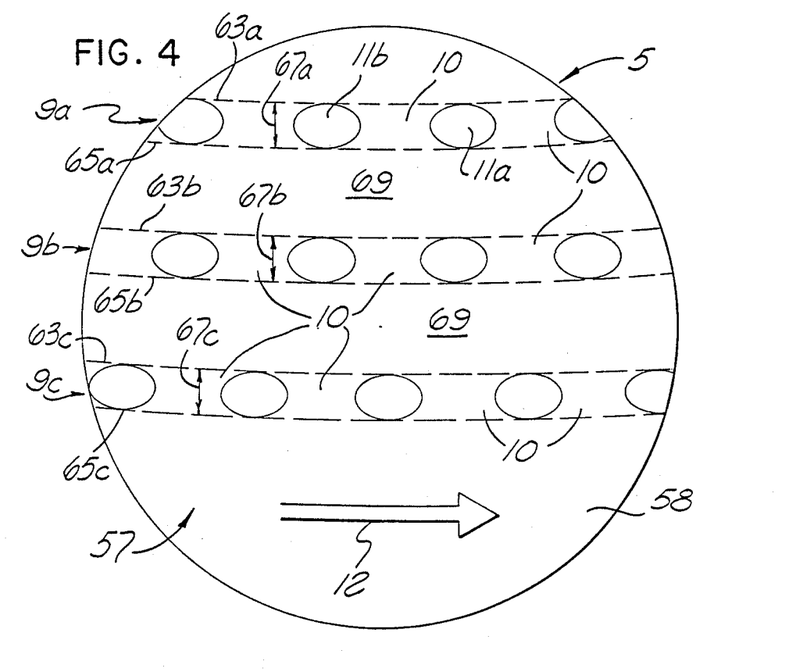
FIG. 4 is an enlarged view of a portion of the surface of the video disc member shown in FIG. 1.

Referring to FIG. 4, there is shown a schematic view of a portion of the information bearing surface 57, including a plurality of tracks 9a, 9b and 9c. Each of the information tracks is a ring-shaped area lying between pairs of broken construction lines shown in FIG. 4. Track 9a is generally lying between pairs of construction lines 63a and 65a, track 9b is generally lying between construction lines 63b and 65b, and track 9c is generally lying between construction lines 63c and 65c. The individual ring-shaped tracks can be formed in a continuous spiral-shaped information track or in concentric circular track segments. Center-to-center spacing of the tracks are typically on the order of 1.5 micron, so that the disc segment shown in FIG. 4 is greatly magnified giving the illusion that the ring-shaped tracks 9 are straight and parallel instead of annular and concentric.

The width of each of the ring-shaped areas 9a, 9b and 9c is in the radial direction and this width dimension (approximately 0.7 microns) is indicated by the length of a line 67a, 67b and 67c, respectively. The length of the ring-shaped areas 9a, 9b, and 9c is in the circumferential direction and varies according to the radius of the ring-shaped member according to the well known formula $2\pi R$.

The planar-shaped portion 58 of the information storage surface 57 further includes planar-shaped inter-track guard regions 69 for separating adjacent tracks such as 9a and 9b. In this top view of an information track such as 9a, the specular reflective regions are shown at 10 and the non-specular reflective regions are shown at 11. In the embodiment shown in FIG. 3, the non-specular light reflective regions 11 are shown as trapezoidal (if viewed in cross-section) having a leading edge 71 and a trailing edge 73, and a planar-shaped upper surface 75 in the form of an oval. As shown in FIG. 3, region 11, having the trapezoidal cross-section, is shown as a frustum of an oval cone, having its surface 59 including an oval-shaped upper surface 75 and a side surface 77.

In the remaining figures, the invention is described having reference to embodiments in the form of disc-shaped information storage carriers, and in particular to video discs containing programs of recorded material which are relatively short as compared with the available length of time that can be recorded on the video disc. The information recorded on the recording medium can be repeated to provide duplication of the program information at two or more locations on the storage member.

Figure 5:
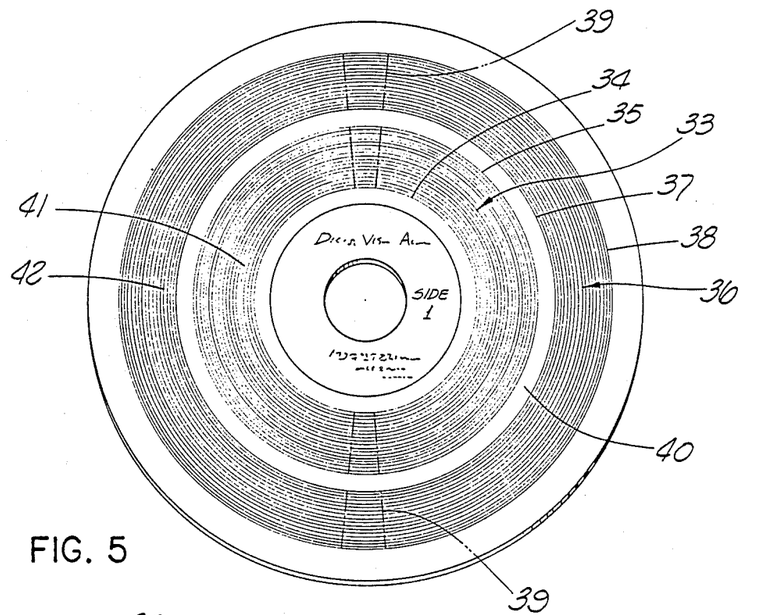
FIG. 5 is a plan view of a video disc containing two bands of program material recorded thereon in a "concentric circles" format.

In FIG. 5, a banded video disc structure is shown containing two bands of program material recorded in a "concentric circle" format. Assuming that the disc is read from inside-to-outside, a first band 33 of the program (first version) is shown to have an upstream beginning location 34 and a downstream end location 35, while the second band 36 of program information (second version) has an upstream beginning location 37 and a downstream end location 38.

In the implementing of this invention, it is necessary for the player with which the disc is used to be able to search the disc to locate specific frames of the recorded program. With the disc turning at 1800 RPM, a complete program picture, displayed on a monitor in two 60 Hz fields, would occupy one complete concentric circle of the band of recorded information. Recorded in the NTSC format, a wedge of recorded information representing the vertical interval between fields would appear as shown by numeral 39 in the figures.

An annular guard band 40, 40a, and 40b is shown in the figures between program versions, although this blank area between repeated program versions is primarily for use of illustrating the invention in the figures, and a practical realization of the invention would result in a series of continuous concentric circles spanning the guard band 40, but the first frame of the second program of information would not begin until the initial concentric circle 37 of the second program band 36.

For illustrative purposes, and recognizing that one side of a video disc can contain as many as 54,000 concentric circular paths, it will be assumed that track 37 is spaced from track 34 by 10,000 track numbers. In the examples of the invention to be discussed, and recognizing the desirability to conform to NTSC standards, each concentric circle, referred to hereinafter synonymously with "track", contains a single frame of video and audio information.

In the still frame or CAV mode, a user can instruct the machine playing the disc of FIG. 5, via a pushbutton control panel or similar device, to locate and playout a particular frame number. In the present example, it may be assumed that frame number 268, illustrated by reference numeral 41 in FIG. 5, is to be played out. The disc player, upon receiving the instruction to locate frame number 268 scans across the disc in a downsteam direction to locate the desired frame, preferably by means of recognizing a recorded time code associated with each frame. Upon finding the desired frame, the player automatically engages in a play mode, and the selected frame is displayed in "still frame" fashion. As dicussed earlier, in the event that, upon searching for such a frame number, the frame number is not located, or the video signal is not within acceptable tolerance limits at that location, the frame number is incremented, by say 10,000 frames, and the player searches for and plays out frame number 10,268 illustrated in FIG. 5 with reference numeral 42.

If the program of each band of information is of such a length that it can be repeated every 10,000 frames (also every 10,000 tracks), the program can be repeated on a disc of 54,000 tracks five times. so that upon the occassion of a very large blemish, defect, or other imperfection in the disc surface spanning two or more bands of repeated program material, the player can jump ahead to frame numbers 20,268, 30,268 or 40,268. Such a five band video disc structure is shown in FIG. 6 wherein the duplicated bands of program are shown at 43 through 47.

Figure 6:
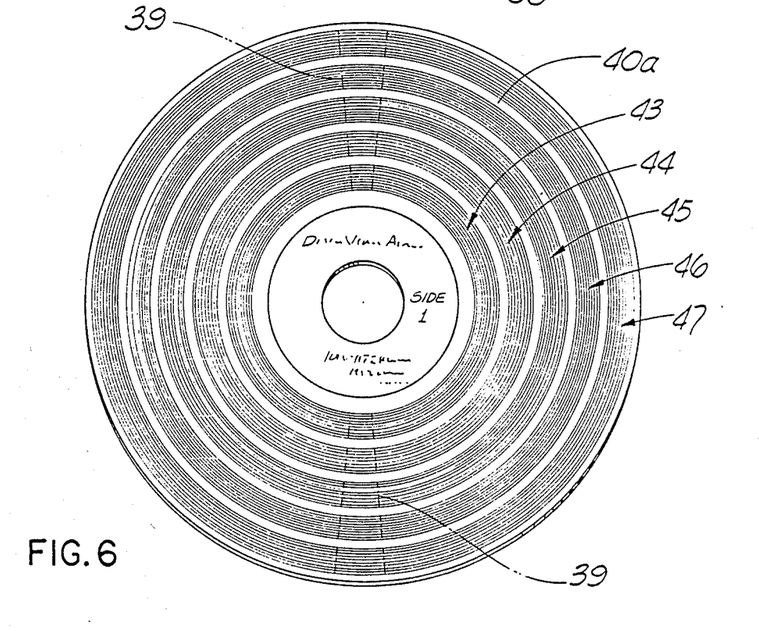
FIG. 6 is a plan view of a video disc showing five bands of a program recorded thereon in a "concentric circles" format.
Figure 7:
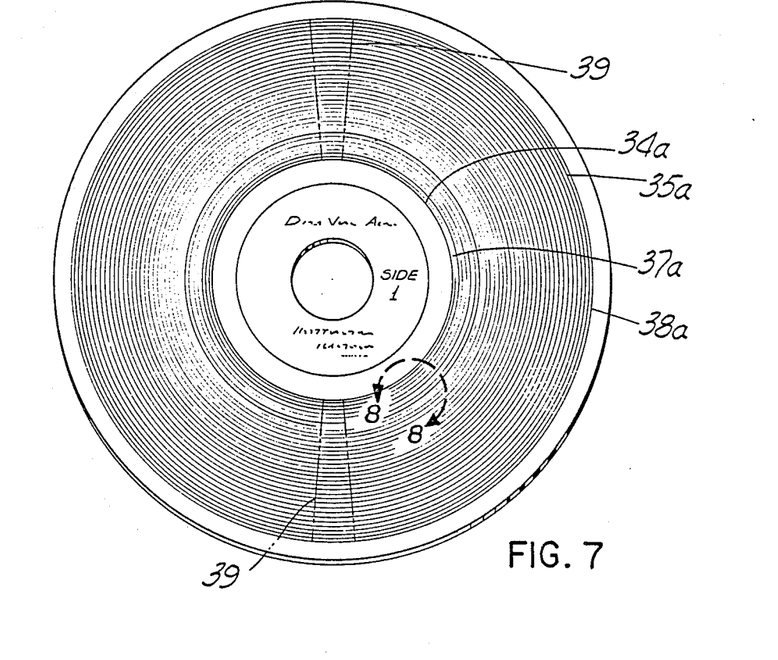
FIG. 7 is a plan view of a video disc encoded in "concentric circles" format with interleaved video program information in accordance with an alternate embodiment of the invention.

FIG. 7 shows a second preferred embodiment of the invention in which the program material is repeated in interleaved fashion on the disc surface. A first version of the program is recorded beginning at an upstream location 34a and ending at a downstream location 35a shown as the second to last track in FIG. 7. A second version of the program is recorded beginning on track 37a spaced downstream one track from the beginning track 34a of the first version of the program and extends to a downstream ending track 38a which is spaced downstream one track from the ending track 35a of the first program version. The recording format of the program in FIG. 7 is, like as in FIGS. 5 and 6, in the form of a plurality of concentric circles. Clearly, a spiraling form of tracks for each program is equally implemented by repeating the program for as many times as is limited by the disc surface area (See FIG. 10 and accompanying description). Likewise, it will be appreciated that in the embodiment of FIG. 7, each concentric circle of the first program version represents a complete frame of video information and is followed in the downstream direction by an identical frame of information of the second version of the program. For shorter programs, more than two repetitions of the program material can be recorded on the same disc side, and using the previous example of a program of 10,000 frames in length, the first five tracks of the disc will be repeated versions of the first frame of the program, the next five tracks will be repeated frames of the second frame of the program material, and similarly for the remaining groups of five tracks until the end frame of the last program version.

Figure 8:
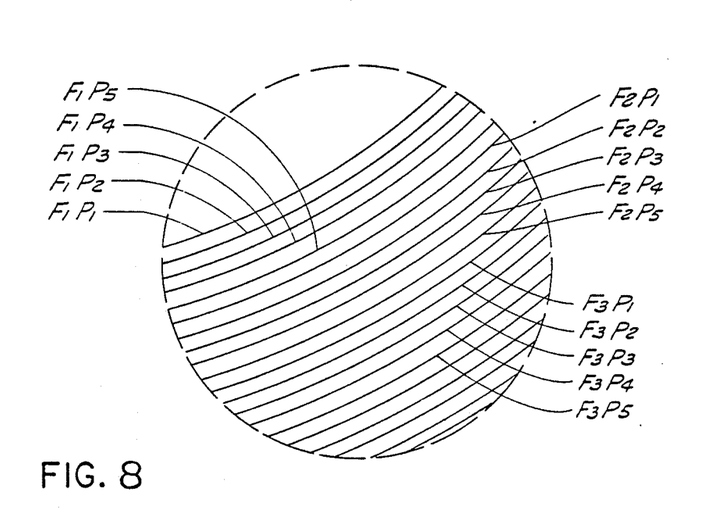
FIG. 8 is a partial enlarged view of a portion of the video disc shown in FIG. 7.

FIG. 8 is an enlarged view of the inner tracks of FIG. 7 illustrating the five program verison embodiment of the invention just described. As can be appreciated by reference to FIG. 8, the first five tracks are all identical in information content and represent, respectively, the first frame of each program version repeated five times. The sixth downstream track is thus the second frame of the first program version, the seventh track is the second frame of the second program version, etc. For ease of undstanding, the tracks shown in FIG. 8 are labeled with the number following the letter "F" representing the frame number, and the number following the letter "P" representing the program version.

The embodiments shown in FIGS. 5 and 6 represent preferred forms of the invention in which a video program is recorded in annular banded areas on the disc, each banded area comprising in a plurality of concentric circles. Even the interleaved embodiments of FIGS. 7 and 8 have been described with the information recorded thereon in "concentric circles" format. Since present day video disc players are capable of still framing from a spiraling track of video program information, each of the repeated programs on the banded video disc structure can, in an alternative embodiment that described above with reference to FIGS. 5 and 6, comprise a spiral track extending from an upstream to a downstream position with each spiral occupying a substantially circular track on the disc surface.

Figure 9:
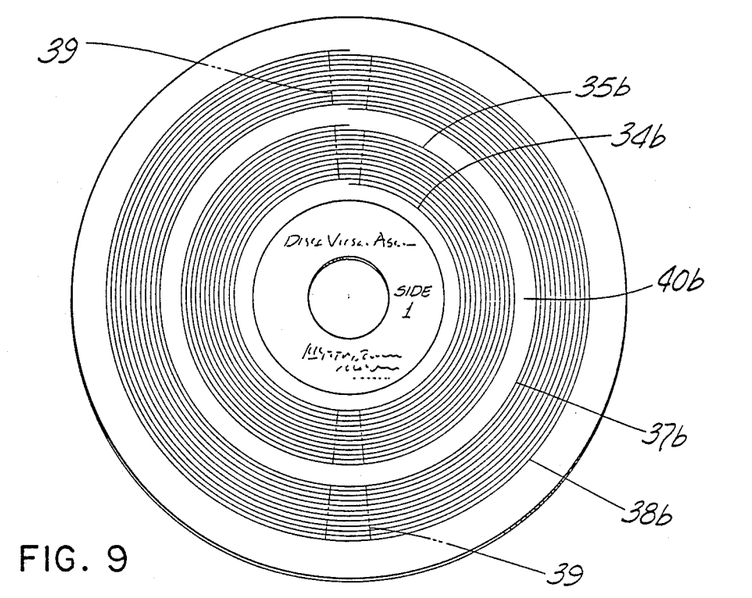
FIG. 9 is a plan view of a video disc structure encoded with bands of programming material with each program arranged in spiral fashion on the disc surface.

FIG. 9 is a plan view of a video disc structure in which the information is recorded in the form of spiral tracks around the disc surface. FIG. 9, in particular, shows the disc encoded with bands of programming material with each program version arranged in spiral fashion and separated from the adjacent program version by an anular guard band 40. As with the earlier embodiments, the spiral from beginning to end of the disc shown in FIG. 9 can be continuous with only the program material segregated in annular bands. For comparison purposes, like reference numberals are used for the beginning and ending tracks of each program band and for the annular guard band 40b as was used in FIG. 5. Other than having the program recorded in spiral format in FIG. 9, there are no physical or functional differences in the manner in which the invention is implemented by this alternative recording technique.

Figure 10:
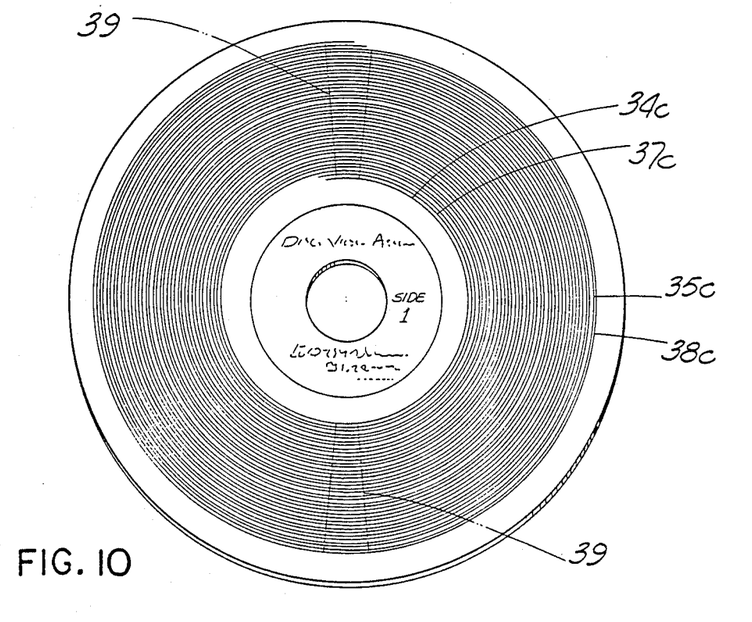
FIG. 10 is a plan view of a video disc structure with interleaved programs in the form of spiral tracks around the disc surface.

Turning now to FIG. 10, there is illustrated a spiral version of the interleaved embodiment of FIG. 7. As before, reference numerals in FIG. 10 correspond to like reference numerals in FIG. 7, the only difference between the two embodiments in these two figures being that FIG. 10 uses a spiral format for the track arrangement, while FIG. 7 uses a concentric circles format. As with the FIG. 7 arrangement, subject to availability of disc surface area, a plurality of interleaved spiral tracks can be recorded on the same disc surface.

Thus there has been shown and described an information storage carrier upon which a program is repeated in either banded or interleaved configuration on the disc surface, thereby providing duplication of the information at two or more locations on the storage member. As a result, a higher yield of usable prerecorded units is realized, since any blemishes or defects in the surface of the storage member containing the information will, in all probability, be localized to such an extent that the player playing back the storage member can search for and play out the same information from a different location on the storage member that is void of the blemish or defect.

While the invention has been particularly shown and described with reference to preferred embodiments thereof, it will be understood by those skilled in the art that changes in form and details may be made therein without departing from the spirit and scope of the invention. For example, in the embodiments shown and described herein, the terms "program", "bands", and "tracks" can be taken to their physical dimensional extremes without excluding the basic concepts undurying the invention. Each "program" can, in the extreme case, constitute a single track, or even partial track, thus occupying a single or partial circular segment or track on the disc. Likewise, a "band" can comprise a single circular or spiral track. Finally, a "track" can constitute an arcurate portion of a concentric circular or spiral segment. In FIG. 9, the most inwardly located track can contain the first frame of the first program version, the next downstream track (continuous from the first) can contain the first frame of the second program version and so on, consistent with the program repeat limits discussed earlier as to available area and program length.

What is claimed is:

1. An information storage carrier for storing intelligence information along a path on said carrier, said carrier comprising:

an information storage member having a surface upon which said information is stored;

a first series of lineal regions arranged on said surface and defining a program of information, said program having a first subprogram part and a second subprogram part each region of said first series of regions containing information representative of a video frame of said program information, each video frame being accompanied by an associated frame identifying number; and a second series of lineal regions arranged on said surface and spaced from said first series of lineal regions, each region of said second series of regions containing information representative of a respective video frame of said second subprogram part of said first series of lineal regions with the accompanying frame number of each region of said second series of lineal regions being of a value higher than that of the corresponding region of said first series of lineal regions by a fixed increment, thereby providing duplication of said second subprogram part of said program of information at two loactions on said storage member each with its own unique series of frame identification numbers.

2. An information storage carrier for storing intelligence information along a path on said carrier, said carrier comprising:

an information storage member having a surface upon which said information is stored;

a first series of lineal regions arranged on said surface and defining a program of information, said program having a first subprogram part and a second subprogram part, said second subprogram part having a series of information segments identified by a corresponding first series of identification numbers; and a second series of lineal regions arranged on said surface and spaced from said first series of lineal regions, each lineal region of said second series of regions containing information segments duplicative of respective information segments of said second subprogram part of said first series of lineal regions, said duplicative series of information segments identified by a corresponding second series of identification numbers, said first series of identification numbers being different than said second series of identification numbers, thereby providing duplication of said second subprogram part of said program of information at two locations on said storage member.

3. A method for storing intelligence information along a path on an information storage carrier, said method comprising the steps of:

providing an information storage member having a surface upon which said information is to be stored;

recording a first series of lineal regions on said surface, defining a program of informaiton, said program having a first subprogram part and a second subprogram part, each region of said first series of regions containing information representative of a video frame of said program information, and each video frame being accompanied by an associated frame identifying number; and recording a second series of lineal regions on said surface, spaced from said first series of lineal regions, each region of said second series of regions containing information representative of a respective video frame of said second subprogram part of said first series of a lineal region with the accompanying frame number of each region of said second series of lineal regions being of a value higher than that of the corresponding region of said first series of lineal regions by a fixed increment, thereby providing duplication of said second subprogram part of said program of information at two locations on said storage member, each with its own unique series of frame identification numbers.

4. A method for storing intelligence information along a path on an information storage carrier, said method comprising the steps of:

providing an information storage member having a surface upon which said information is to be recorded;

recording a first series of lineal regions on said surface, defining a program of information, said program having a first subprogram part and a second subprogram part, said second subprogram part having a series of information segments identified by a corresponding first series of identification numbers; and recording a second series of lenial regions arranged on said surface and spaced from said first series of lineal regions, each lineal region of said second series of regions containing information segments duplicative of respective information segments of said second subprogram part of said first series of lineal regions, said duplicative series of information segments identified by a corresponding second series of identification numbers, said first series of identification numbers being different than said second series of identifications numbers, thereby providing duplication of said second subprogram part of said program of information at two locations on said storage member.

* * * * *